United States Patent [19]

Nishizawa

[11] Patent Number: 5,068,218

[45] Date of Patent: Nov. 26, 1991

[54] HONEYCOMB METAL CATALYST APPARATUS

[75] Inventor: Kimiyoshi Nishizawa, Kanagawa, Japan

[73] Assignee: Nissan Motor Co., Ltd., Yokohama, Japan

[21] Appl. No.: 527,441

[22] Filed: May 23, 1990

[30] Foreign Application Priority Data

Jun. 1, 1989 [JP] Japan .................................. 1-140020

[51] Int. Cl.$^5$ .......................... B01J 32/00; B01J 35/04
[52] U.S. Cl. ..................................... 502/439; 502/527
[58] Field of Search ................................ 502/439, 527

[56] References Cited

U.S. PATENT DOCUMENTS

| 4,098,722 | 7/1978 | Cairns et al. | 502/527 X |
| 4,818,746 | 4/1989 | Cyron | 502/527 |
| 4,845,073 | 7/1989 | Cyron | 502/439 |

Primary Examiner—W. J. Shine
Attorney, Agent, or Firm—Foley & Lardner

[57] ABSTRACT

In the honeycomb metal catalyst apparatus having a roughly cylindrical metal catalyst carrier body formed by spirally and alternately winding a first large-wave-pitch sheet-metal layer and a second small-wave-pitch sheet-metal layer in stacked fashion so as to form a great number of honeycomb gas flow conduits, the ratio in wave pitch of the first layer and the second layer is determined as $0.75 < P_2/P_1 < 1.0$, whose ratios are not determined by two relatively small integers. This is because since the contact points between the first and second corrugated sheet-metal layers are shifted little by little out of phase from each other along the circumferential direction of the carrier body, it is possible to decrease the undesirable chances that the troughs (or the crests) of the first corrugated sheet-metal layer are in contact with the crests (or the troughs) of the second corrugated sheet-metal layer or vice versa or to increase the periodic circumferential dimension between two same-phase contact points of the two corrugated layers or to obtain an even distribution in cross-sectional shapes of the honeycomb gas flow conduits, without being subjected to the influence of dimensional errors of the two corrugated sheet-metal layers.

8 Claims, 5 Drawing Sheets

HONEYCOMB METAL CATALYST APPARATUS

BACKGROUND OF THE INVENTION

1. Field of the Invention

The present invention relates to a honeycomb metal catalyst apparatus, and more specifically to a honeycomb metal catalyst apparatus provided with a carrier body formed by spirally and alternately winding two corrugated sheet-metal layers of different wave pitches in stacked fashion.

2. Description of the Prior Art

An example of honeycomb metal catalyst apparatus used in exhaust gas systems of automotive vehicles for air pollution prevention is disclosed in U.S. Pat. No. 4,845,073 by Theodor Cyron, entitled METAL CATALYST CARRIER BODY HAVING TWO DISSIMILARLY CORRUGATED SHEET-METAL LAYERS for instance, which is incorporated herein by reference.

FIGS. 1(A) and (B) show this prior-art honeycomb metal catalyst apparatus, in which a metal honeycomb carrier body 21 is formed into a roughly cylindrical shape by spirally and alternately winding a first corrugated sheet-metal layer 23 having a relatively large wavelength (i.e. wave pitch $P_1$) and amplitude and a second corrugated sheet-metal layer 24 having a relatively small wavelength (i.e. wave pitch $P_2$) and amplitude in synchronized and stacked fashion so as to provide a number of conduits (honeycomb portions) 25 therebetween. In this prior-art honeycomb metal catalyst apparatus, however since the ratio of the wave pitch $P_1$ of the first sheet-metal layer 23 and that $P_2$ of the second sheet-metal layer 24 is determined on the basis of two integers so that the two corrugated layers are brought into contact in synchronism with each other, in the case of $P_2/P_1 = \frac{1}{2}$ as shown in FIGS. 1(A) and 1(B), the troughs of the first sheet-metal layer 23 are theoretically in contact with the troughs of the second sheet-metal layer 24, so that a great number of uniform gas flow conduits 25 can be formed continuously, between the two first and second sheet-metal layers 23 and 24.

In practice, however, since it is impossible to manufacture the honeycomb metal carrier body 21 having absolutely accurate wave pitches, that is, since the wave pitches of the corrugated sheet-metal layer 23 or 24 are inevitably formed irregular to some extent, when the two corrugated sheet-metal layer 23 and 24 are expanded as shown in FIG. 1(B), there exist three regions A, B and C as follows:

In the region A, the troughs of the first layer 23 are in contact with the troughs of the second layer 24; in the region B, the troughs of the first layer 23 are slightly offset from troughs of the second layer 24; and in the region C, the troughs of the first layer 23 are in contact with the crests of the second layer 24. This is because the ratio of the wave pitch $P_1$ of the first layer 23 and that $P_2$ of the second layer 24 is determined on the basis of the integer relationship with respect to each other, as already described.

On the other hand, the radial (double) stack distance D between the inner troughs of the second layer 24 and the outer crests of the first layer 23 changes according to the above-mentioned three regions A, B and C. That is, the radial stack distance $D_1$ between the two layers 23 and 24 at the region A is smaller than that $D_2$ at the region C. Therefore, there exists a problem in that the exhaust gas flow resistance at the region C is smaller than that at the region A, so that the catalyst metal is irregularly consumed much at the region A; that is, there exists a problem in that the catalyst performance is not uniform in the honeycomb metal catalyst apparatus. In addition, since these alternately stacked or wound sheet-metal layers 23 and 24 are compressed in the radial direction and fitted into a cylindrical or an elliptically cylindrical casing, the contact pressure between the first and second layers 23 and 24 at the region A is smaller than that at the region C, so that there exists another problem in that the first and second sheet-metal layers 23 and 24 are easily separated from each other at the region A and therefore the honeycomb metal carrier body itself is deformed or damaged, thus raising various problems in reliability and service life thereof.

SUMMARY OF THE INVENTION

With these problems in mind, therefore, it is the primary object of the present invention to provide a honeycomb metal catalyst apparatus which can provide a uniform gas flow resistance and a uniform contact pressure between the first and second corrugated sheet-metal layers of different wave pitches throughout the metal catalyst body in order to improve the reliability and the service life thereof.

To achieve the above-mentioned object, the honeycomb metal catalyst apparatus, according to the present invention, having a metal catalyst carrier body formed by spirally and alternately winding a first corrugated sheet-metal layer with a relatively large wave pitch $P_1$ and a second corrugated sheet-metal layer with a relatively small wave pitch $P_2$ in stacked fashion so as to form a great number of honeycomb gas flow conduits is characterized in that a ratio in the wave pitch of said first corrugated sheet-metal layer and said second corrugated sheet-metal layer lies within a range of $$0.75 < P_2/P_1 < 1.0$$

When the manufacturing error in dimensions of the first and second corrugated sheet-metal layers is taken into consideration, the more preferable ratio lies within a range of $$0.77 < P_2/P_1 < 0.98$$

Further, a ratio of a radius $R_2$ of curvature at crests and troughs to the wave pitch $P_2$ of the second corrugated sheet-metal layer lies within a range of $$R_2/P_2 \geq 0.3$$

In the honeycomb metal catalyst apparatus according to the present invention, since the ratio $P_2/P_1$ in wave pitch of the second corrugated metal-sheet layer to the first corrugated metal-sheet layer is not determined as any one of ratios obtained by two relatively small integers, the contact points between the first and second corrugated metal-sheet layers are shifted little by little out of phase from each other along the circumferential direction of the metal carrier body. Therefore, it is possible to decrease the undesirable chances that the troughs (or the crests) of the first corrugated sheet-metal layer are in contact with the crests (or the troughs) of the second corrugated sheet-metal layer or vice versa, or to increase the periodic dimension between the two same-phase contact points of the first and second sheet-metal layers; that is, to evenly distribute the cross-sectional shapes or areas of the honeycomb gas conduits formed between the two corrugated layers throughout the carrier body, without being subjected to the influence of dimensional errors of the two corrugated layers in manufacturing process. Since the gas flow resistance can be made uniform, the catalyst metal coated on the corrugated layers can be consumed uniformly and therefore uniform purification performance can be maintained for many hours. Further, since the two corrugated layers are uniformly brazed or welded to each other at contact points between the two layers, the bonding strength between the two layers can be increased and therefore the service life of the carrier body can be improved.

DETAILED DESCRIPTION OF THE PREFERRED EMBODIMENTS

Embodiments of the honeycomb metal catalyst apparatus according to the present invention will be described herein-below with reference to the attached drawings.

Figure 2:
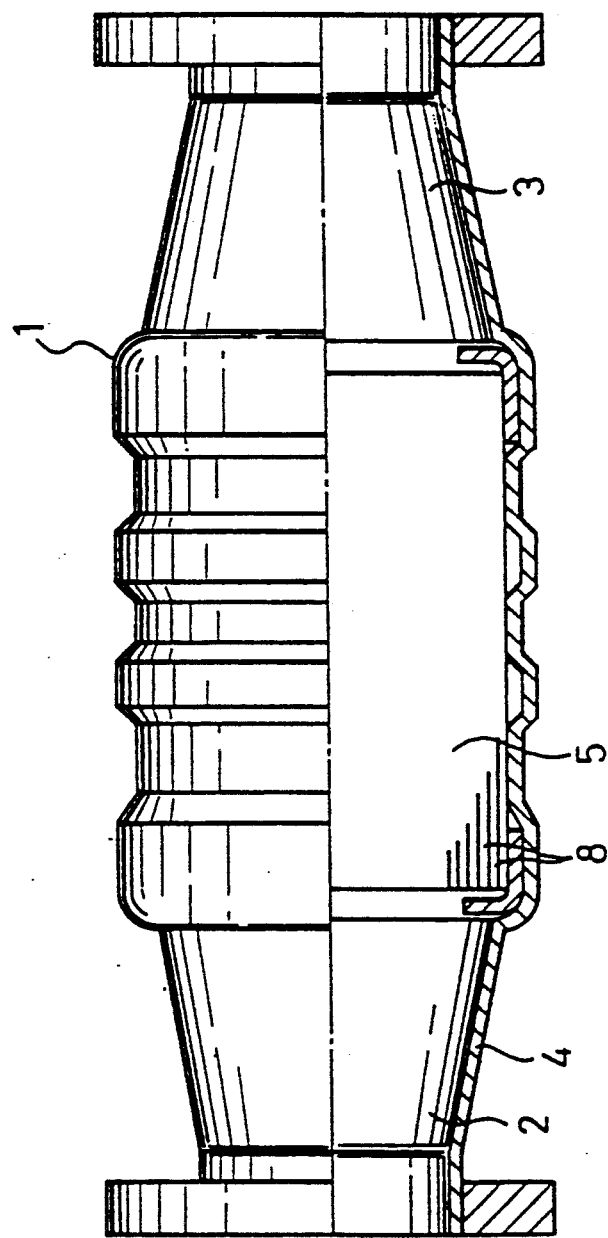
FIG. 2 is a half side and half cross-sectional view showing the metal catalyst apparatus of the present invention.

In FIG. 2 the honeycomb metal catalyst apparatus 1 of the present invention is composed of a roughly cylindrical or elliptically cylindrical casing 4 having an exhaust inlet 2 and an exhaust outlet 3, and a honeycomb metal carrier body 5 housed within the casing 4. This casing 4 is connected midway between an engine and an exhaust passage so that engine exhaust gas is passed therethrough. Since the catalyst carrier body 5 is coated with a catalyst metal, the exhaust gas passing through the casing 4 in contact with the catalyst metal is purified for air pollution prevention.

The catalyst carrier body 5 is formed by spirally winding a first corrugated sheet-metal layer (metal foil) 6 and a second corrugated sheet-metal layer (metal foil) 7 alternately in stacked fashion so that a great number of honeycomb gas flow conduits 8 are formed between the two sheet-metal layers 6 and 7. The thickness of each of the two sheet-metal layers 6 and 7 is about 50 u. Further, contact points between the two sheet-metal layers 6 and 7 are brazed or welded to each other in the radial direction of the casing 4, whenever the first layer 6 is stacked upon the second layer 7 to obtain a rigidly wound catalyst carrier body 5.

Figure 3A:
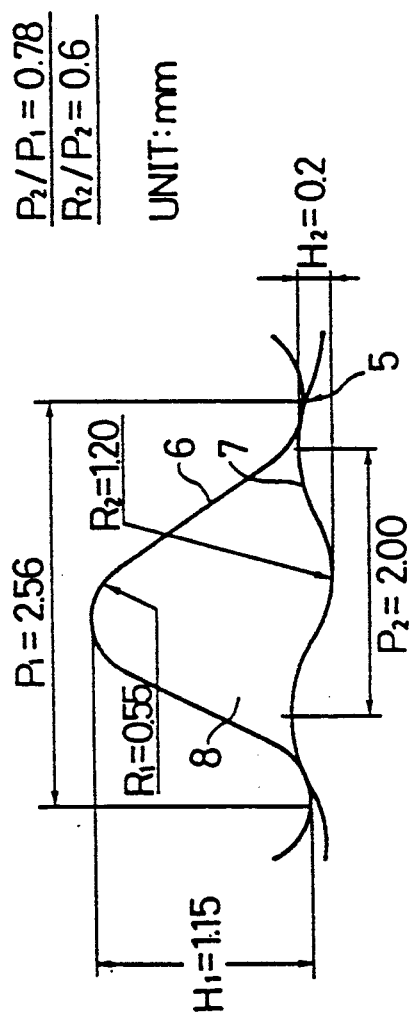
FIG. 3(A) is a single, diagrammatical, greatly enlarged end-elevational view showing an embodiment of the honeycomb metal catalyst apparatus according to the present invention.
Figure 3B:
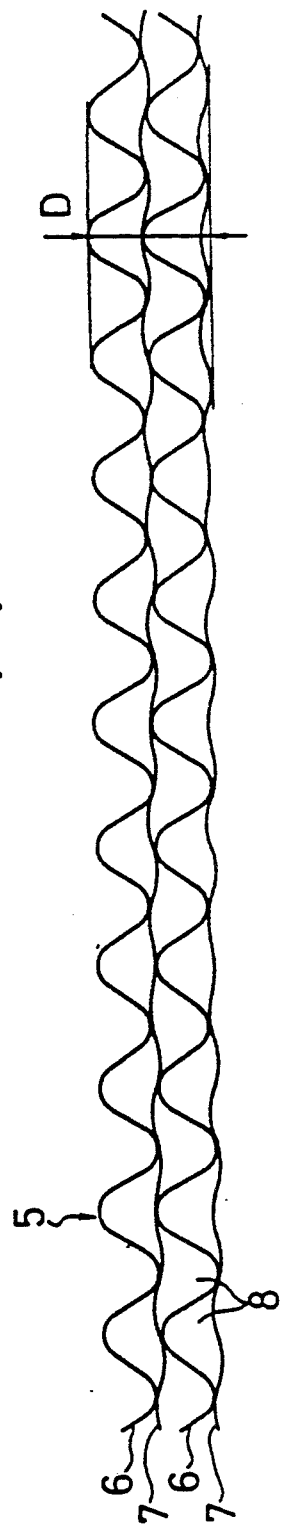
FIG. 3(B) is an expanded view of the apparatus shown in FIG. 3(A)

FIG. 3(A) shows a greatly enlarged single honeycomb conduit 8 formed by joining the two sheet-metal layers 6 and 7, and FIG. 3(B) shows a great number of honeycomb conduits 8 expanded straight in the circumferential direction of the catalyst carrier body 5. As shown in these drawings, the radial wave height $H_1$ and the wave pitch (i.e. wavelength) $P_1$ of the first sheet-metal layer 6 are determined to be larger than the radial wave height $H_2$ and the wave pitch (i.e. wavelength) $P_2$ of the second sheet-metal layer 7 in such a way that the ratio ($P_2/P_1$) in wave pitch between the two layers 6 and 7 lies within the following range:

$$0.75 < P_2/P_1 < 1.0$$

Here, it should be noted that the above-mentioned ratio is not determined by two relatively small integers. - / In this connection, in the prior-art catalyst carrier defined in claim 1 as follows:

$$P_2/P_1 = 0.5(\tfrac{1}{2}), 0.6(3/5), 0.75(\tfrac{3}{4}), 1, 1.5(2/3), 2 \text{ or } 3$$

Here, it should be noted that the same ratio is determined by two relatively small integers.

In practice of the catalyst carrier body 5 according to the present invention, the first sheet-metal layer 6 is formed with a wave pitch $P_1 = 2.56$ mm, a radial wave pitch $H_1 = 1.15$ mm, and a radius of curvature $R_1 = 0.55$ mm; while the second sheet-metal layer 7 is formed with a wave pitch $P_2 = 2.00$ mm, a radial wave height $H_2 = 0.2$ mm, and a radius of curvature $R_2 = 1.20$ mm. Therefore, in this example, the ratio $P_2/P_1$ is $2.00/2.56 = 25/32 = 0.78$. In this example therefore, the phase difference between the two layers 6 and 7 at the contact point between the 1st two sheet-metal layers 6 and 7 is roughly the same as at the contact point between the 25th first sheet-metal layer 6 and the 32th second sheet-metal layer 7, thus increasing the periodic circumferential dimension between the two same-phase contact points of the first and second sheet-metal layers. In other words, since the contact points between the first and second sheet-metal layers 6 and 7 are shifted little by little out of phase from each other along a circumferential direction of the carrier body 5, although the gas flow conduits 8 arranged along the circumferential direction of the catalyst carrier body 5 are different in cross-sectional shape from each other, it is possible to evenly distribute the various cross-sectional shapes of the honeycomb conduits 8 as a whole or under well-balanced conditions.

Further, in the catalyst apparatus according to the present invention, since the ratio $P_2/P_1$ is not determined by two relatively small integers, it is also possible to consider that the undesirable chances can be decreased such that the troughs (or the crests) of the first corrugated sheet-metal layer are in contact with the crests (or the troughs) of the second corrugated sheet-metal layer or vice versa.

Further, in this embodiment, it is preferable to determine the radius $R_2$ of curvature of the second sheet-metal layer 7 within a range of $$R_2 \geq 0.3\, P_2$$

as described later in further detail with reference to FIG. 5. In this embodiment, $R_2$ is determined as $$R_2 = 0.6 \times P_2 = 0.6 \times 2.00 = 1.20 \text{ mm}$$

Further, each of the first and second corrugated sheet-metal layers is formed by first describing circular arcs at crests and troughs thereof and by connecting the described circular arcs by straight lines.

The function of the honeycomb metal catalyst apparatus according to the present invention will be described hereinbelow.

In the honeycomb metal carrier body 5 of the present invention, since the ratio $P_2/P_1$ in the wave pitch of the second metal-sheet layer 7 to the first metal-sheet layer 6 is not determined as one of ratios obtained by two relatively small integers, being different from the prior-art catalyst carrier body, the contact points between the first and second metal-sheet layer 6 and 7 are shifted little by little out of phase from each other along the circumferential direction of the carrier body 5. Therefore, although the cross-sectional shapes of the series-formed honeycomb conduits 8 are different from each other, it is possible to make uniform the distribution of the various cross-sectional shapes of the honeycomb conduits 8 as a whole. Therefore, even if the wave pitch $P_1$ or $P_2$ of the corrugated sheet-metal layer 6 or 7 is not formed uniformly due to dimensional errors in the manufacturing process, the cross-sectional shapes of the honeycomb conduits 8 formed between the first and second corrugated sheet-metal layers 6 and 7 can be evenly distributed as a whole. As a result, it is possible to make uniform the exhaust gas flow resistance of the catalyst carrier body 5, irrespective of the irregularity in dimensions of the corrugated sheet-metal layers 6 and 7, thus providing a uniform predetermined gas purification performance of exhaust gas, without partially consuming the catalyst metal coated on the sheet-metal layers.

Figure 4:
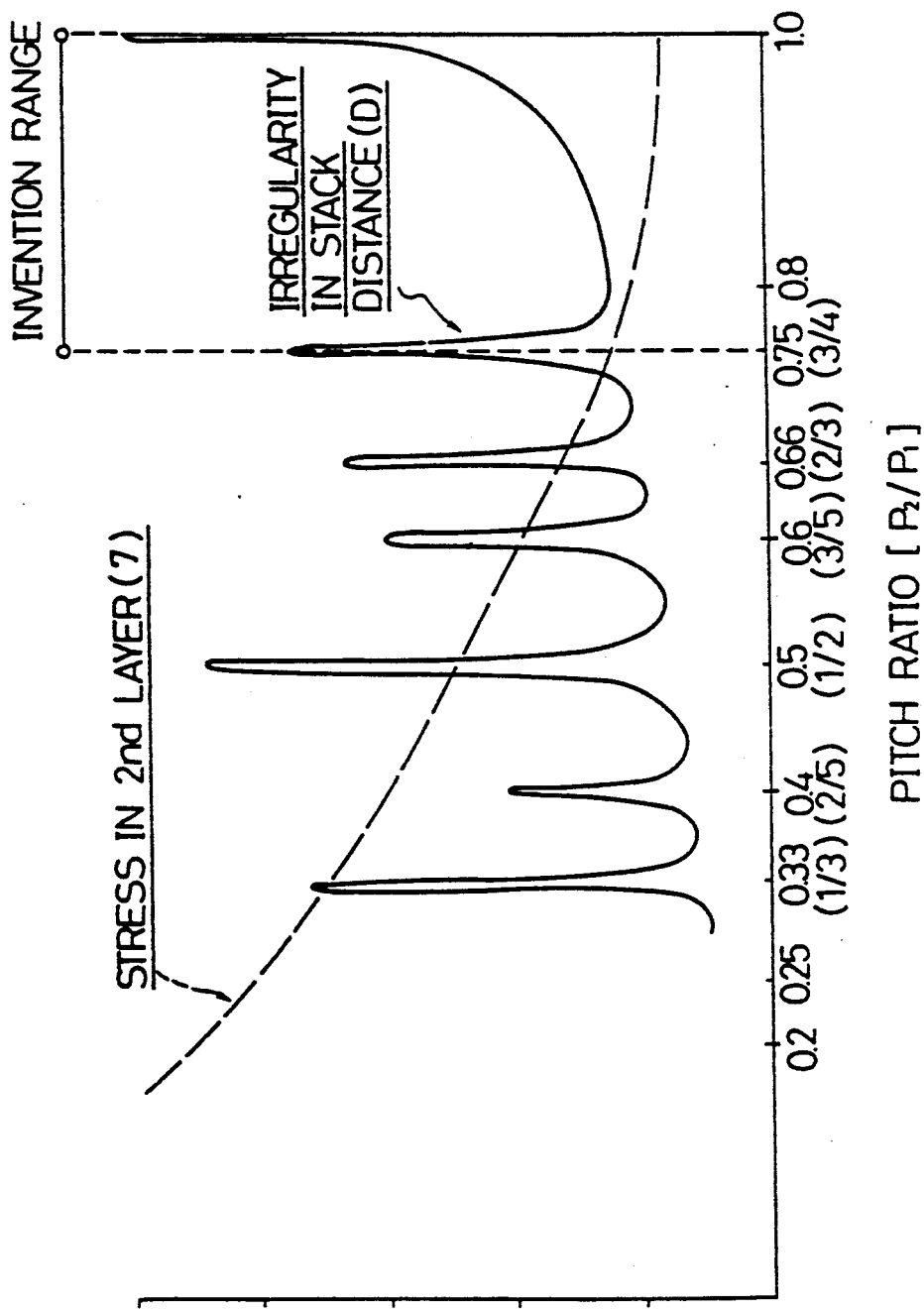
FIG. 4 is a graphical representation showing the relationship between the pitch ratio ($P_2/P_1$) of the two sheet-metal layers and the thermal stress generated in the second corrugated sheet-metal layer, the irregularity in the radial (double) stack distance D between the two corrugated sheet-metal layers.

FIG. 4 shows the relationship between the wave pitch ratio $(P_2/P_1)$ of the first and second sheet-metal layers 6 and 7 are the irregularity in the radial (double) stack distance D (shown in FIG. 3(B)) by solid curves and the relationship between the same wave pitch ratio $(P_2/P_1)$ and the thermal stress generated in the second sheet-metal layer 7 (when the pitch $P_1$ is kept constant) by a dashed curve.

Figure 1A:
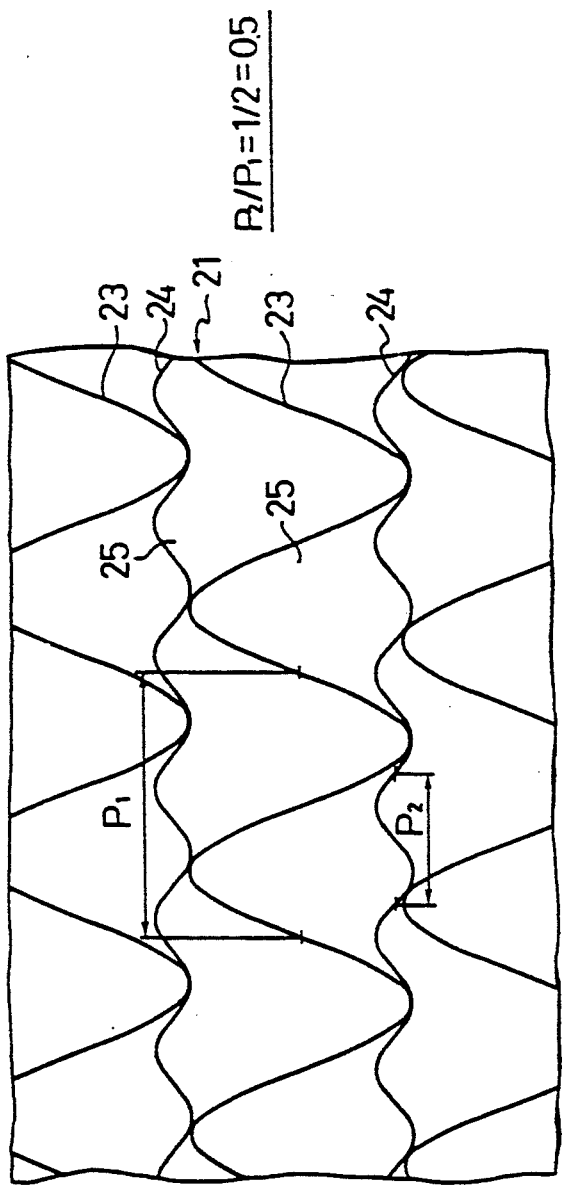
FIG. 1(A) is a fragmentary, diagrammatical, greatly enlarged end-elevational views showing a prior-art honeycomb metal catalyst apparatus.
Figure 1B:
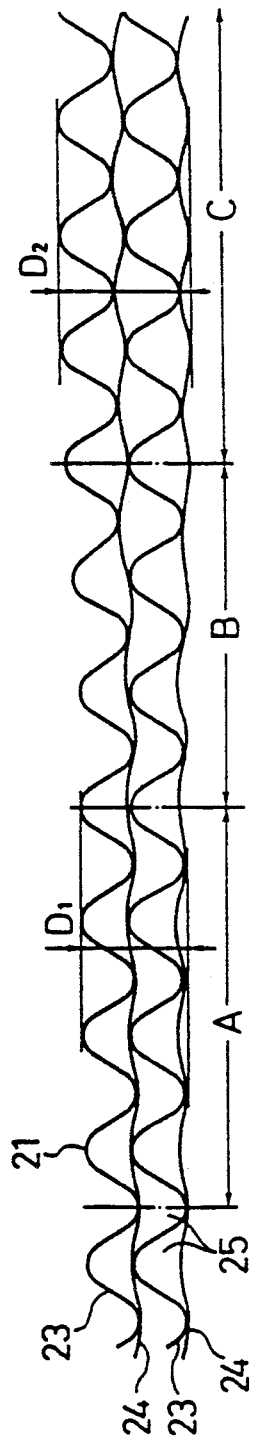
FIG. 1(B) is an expanded view of the apparatus shown in FIG. 1(A)

The solid lines shown in FIG. 4 indicate that the irregularity in the radial stack distance D is extremely large when the wave pitch ratio $(P_2/P_1)$ is at 0.33 (1/3), 0.4 (2/5), 0.5 (½), 0.6 (3/5), 0.66 (2/3), 0.75 (¾), and 1. The reason is as follows: when the wave pitch $P_1$ or $P_2$ of the sheet-metal layer 23 or 24 deviates due to dimensional errors in the manufacturing process from such a predetermined value as determined by two relatively small integers, as already explained under the Description of the Prior Art, there exist uneven distributions such that the troughs of the two corrugated layers 23 and 24 are in contact with each other regularly and therefore the radial stack distance $D_1$ is relatively small as at the region A in FIG. 1(B), and the troughs of the first corrugated layer 23 are in contact with the crests of the second corrugated layer 24 irregularly and therefore the radial stack distance $D_2$ is relatively large as at the region C in FIG. 1(B). The degree of the irregularity in the stack distance D is maximum at $P_2/P_1 = 1$ and follows in the order of ½, ⅓ (the numerator is 1), ¾, 170 , 3/5, 2/5, etc., as depicted in FIG. 4.

On the other hand, since the honeycomb metal catalyst apparatus is repeatedly heated and cooled according to the engine operating conditions, a large temperature gradient is always produced in the catalyst carrier body 5, so that the carrier body 5 is exposed to serve partial alternating thermal (compressive and tensile) stresses.

In more detail, when the engine is started and therefore high temperature exhaust gas beings to flow through the catalyst carrier body 5, the central portion of the carrier body 5 is first heated and then the outer circumferential portion thereof is gradually heated. Further, when the engine is decelerated from the condition that the carrier body 5 is heated uniformly, the central portion of the carrier body 5 is first cooled and thereafter the outer circumferential portion thereof is cooled. In addition to the radial temperature gradient of the engine acceleration and deceleration, since the outer circumferential portion of the catalyst carrier body 5 is cooled by the external air, the temperature gradient is high in particular on the outer circumferential side of the carrier body 5 and therefore the carrier body 5 is subjected to severe alternating thermal compressive and tensile stresses.

The dashed line shown in FIG. 4 indicates that the thermal stress generated in the second corrugated sheet-metal layer 7 decreases with increasing wave pitch $P_2$ of the second corrugated sheet-metal layer 7 when the wave pitch $P_1$ of the first corrugated sheet-metal layer 6 is kept constant. This is because when the wave pitch $P_2$ increase, since the radius $R_2$ of the curvature of the second corrugated sheet-metal layer 7 also increases, it is possible to reduce the thermal stress generated in the second layer 7.

In summary, FIG. 4 indicates that the preferable range of $P_2/P_1$ lies within a range larger than 0.75 but smaller than 1.0 ($0.75 < P_2/P_1 < 1$) under due consideration of both the irregularity of the radial stack distance D and the thermal stress generated in the second corrugated sheet-metal layer 7.

In practice, since a dimensional error of about 0.02 is inevitably produced in the wave pitch ratio $P_2/P_1 (P_2/P_1 < 0.02)$, the most preferable range thereof is $0.77 < P_2/P_1 < 0.98$.

Figure 5:
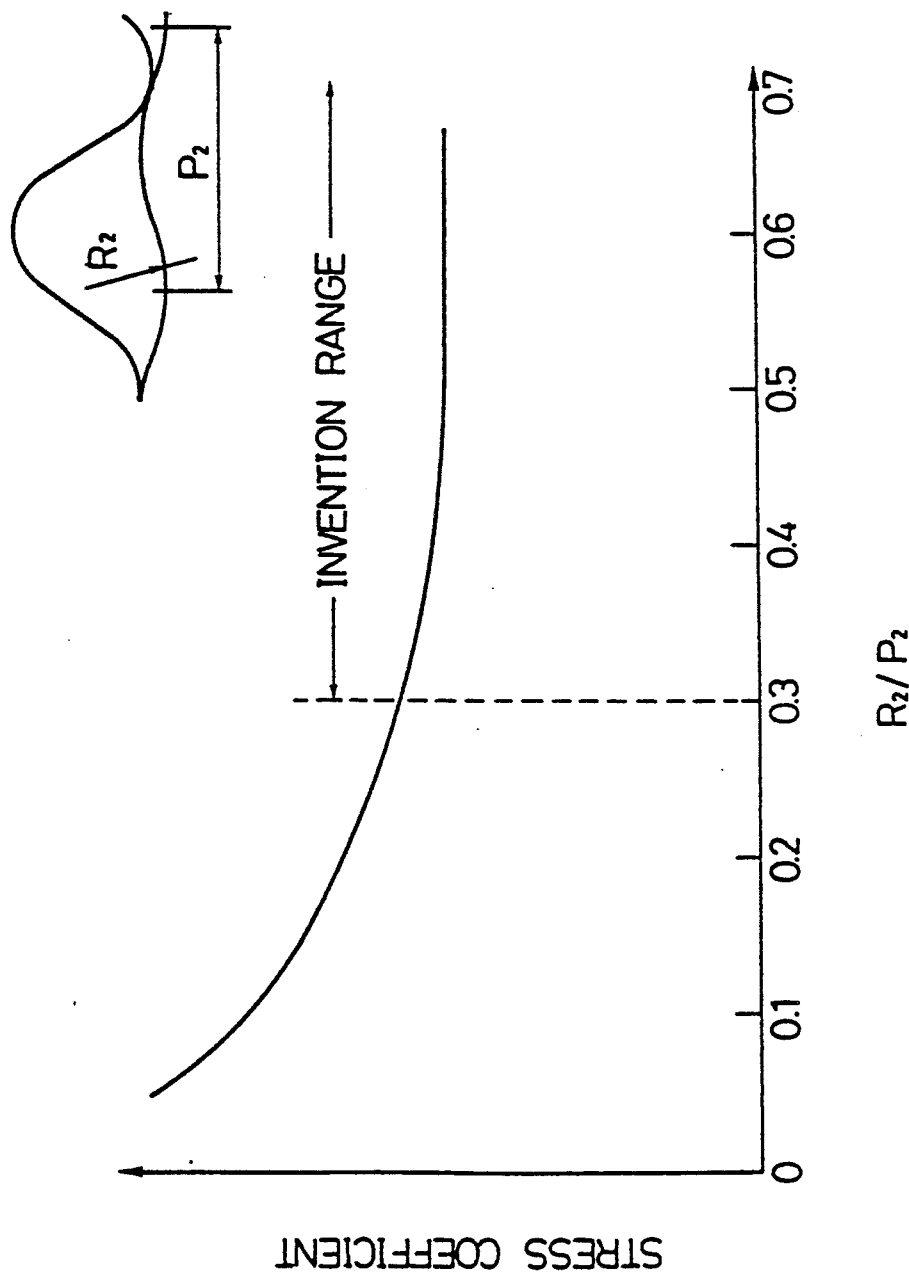
FIG. 5 is a graphical representation showing the relationship between the corrugation shape ($R_2/P_2$) of the second sheet-metal layer and the stress coefficient of the second layer.

FIG. 5 shows the relationship between the ratio $(R_2/P_2)$ of the radius $R_2$ of curvature of the second corrugated layer 7 to the wave pitch $P_2$ of the same second layer 7 and the thermal stress coefficient in the same second layer 7. FIG. 5 indicates that the thermal stress coefficient of the second corrugated layer 7 decreases with increasing radius $R_2$ of curvature of the second layer 7 when the wave pitch $P_2$ is kept constant, and it is possible to sufficiently reduce the thermal stress coefficient of the second layer 7 when the ratio $(R_2/P_2$ is determined to be 0.3 or more ($R_2/P_2 \geq 0.3$). In the present embodiment, since $R_2 = 1.20$ mm and $P_2 = 2.00$ mm, $R_2/P_2 = 0.6$. When this ratio $R_2/P_2$ is determined large, since the radius $R_2$ of curvature of the second corrugated sheet-metal layer 7 is proportionally large, it is possible to sufficiently absorb the thermal stress and therefore to effectively prevent the occurrence of cracks on the second corrugated layer 7 due to alternating thermal compressive and tensile stresses.

As described above, in the honeycomb metal catalyst apparatus according to the present invention, since the wave pitch ratio $P_2/P_1$ of the first corrugated sheet-metal layer and the second corrugated sheet-metal layer is determined within a range of 0.75 $P_2/P_1 1$, it is possible to obtain a great number of honeycomb gas flow conduits formed between the first and second corrugated sheet-metal layers, whole cross-sectional shapes or areas are evenly distributed as a whole, and therefore to make uniform the exhaust gas flow resistance of the catalyst carrier body without being subjected to the influence of the irregurality of dimensional error of the first and second corrugated sheet-metal layers. Therefore, the catalyst metal coated on the corrugated layers can be consumed uniformly, so that it is possible to maintain the reliable exhaust gas purification performance for many hours. In addition, since the first and second corrugated layers are uniformly welded or brazed to each other, it is possible to prevent the disconnection between the two corrugated layers, thus improving the durability and the reliability of the metal catalyst apparatus.

What is claimed is:

1. A honeycomb metal catalyst apparatus having a metal catalyst carrier body formed by spirally and alternately winding a first corrugated sheet-metal layer with a relatively large wave pitch $P_1$ and a second corrugated sheet-metal layer with a relatively small wave pitch $P_2$ in stacked fashion so as to form a great number of honeycomb gas flow conduits, wherein a ratio of the wave pitch of said first corrugated sheet-metal layer to the wave pitch of said second corrugated sheet-metal layer lies within a range of $$0.75 < P_2/P_1 < 1.0$$

2. The honeycomb metal catalyst apparatus of claim 2, wherein the ratio lies within a range of $$0.77 < P_2/P_1 < 0.98$$

under consideration of manufacturing error in dimensions of said first and second corrugated sheet-metal layers.

3. The honeycomb metal catalyst apparatus of claim 1, wherein a ratio of a radius $R_2$ of curvature at crests and troughs of said second corrugated sheet-metal layer to the wave pitch $P_2$ of said second corrugated sheet-metal layer lies within a range of $$R_2/P_2 \geqq 0.3$$

4. The honeycomb metal catalyst apparatus of claim 1, wherein contact points between said first and second corrugated sheet-metal layers are shifted little by little out of phase from each other along a circumferential direction of the carrier body, to increase a periodic circumferential dimension between two same-phase contact points of said first and second sheet-metal layers, for providing an even distribution in cross-sectional shapes of the honeycomb gas flow conduits, without being subjected to influence of dimensional errors of said two corrugated sheet-metal layers.

5. The honeycomb metal catalyst apparatus of claim 1, wherein each of said first and second corrugated sheet-metal layers is formed by described circular arcs at crests and troughs thereof and connecting the described circular arcs by straight lines.

6. The honeycomb metal catalyst apparatus according to claim 1, wherein said corrugated sheet-metal layers are connected to each other at contact points therebetween.

7. The honeycomb metal catalyst apparatus according to claim 6, wherein said corrugated sheet-metal layers are connected to each other by being uniformly brazed at said contact points therebetween.

8. The honeycomb metal catalyst apparatus according to claim 6, wherein said corrugated sheet-metal layers are connected to each other by being uniformly welded at said contact points therebetween.

* * * * *